United States Patent
Joyner

(10) Patent No.: US 7,213,997 B1
(45) Date of Patent: May 8, 2007

(54) HERBICIDE APPLICATOR

(76) Inventor: E. Carroll Joyner, 4607-B Grinding Stone Dr., Raleigh, NC (US) 27604

( * ) Notice: Subject to any disclaimer, the term of this patent is extended or adjusted under 35 U.S.C. 154(b) by 0 days.

(21) Appl. No.: 11/196,078

(22) Filed: Aug. 3, 2005

(51) Int. Cl.
*B05C 1/00* (2006.01)
*B43M 11/02* (2006.01)
*A46B 11/00* (2006.01)
*B43K 1/06* (2006.01)

(52) U.S. Cl. .................. 401/197; 401/219; 401/48; 401/265

(58) Field of Classification Search .......... 401/208, 401/218–220, 197, 121, 122, 48, 265; 492/32; 47/1.5
See application file for complete search history.

(56) References Cited

U.S. PATENT DOCUMENTS

| | | | |
|---|---|---|---|
| 3,321,795 A * | 5/1967 | Richardson | 401/197 |
| 3,651,600 A * | 3/1972 | Ewing | 47/1.5 |
| 4,357,779 A | 11/1982 | Maddock | |
| 4,409,755 A | 10/1983 | Maddock | |
| 4,422,789 A * | 12/1983 | Charney et al. | 401/218 |
| 4,471,568 A * | 9/1984 | Keeton | 47/1.5 |
| 4,478,671 A * | 10/1984 | Freeman | 156/391 |
| 6,123,478 A | 9/2000 | Giles | |

OTHER PUBLICATIONS 3 sheets printed from www.benmeadows.com displaying the "WALK-A-WICK® Gravity Herbicide Applicator".

* cited by examiner

*Primary Examiner*—David J. Walczak
(74) *Attorney, Agent, or Firm*—Coats & Bennett, P.L.L.C.

(57) ABSTRACT

An herbicide applicator assembly for applying herbicide to a treatment area. The applicator assembly includes a frame and a contact roller rotatably coupled to the frame for applying herbicide to the treatment area. Herbicide is applied to the roller and transferred to the treatment area as the roller rolls across the treatment area. A discharge port may be disposed in the roller interior for supply of herbicide thereto, and the roller outer surface may include a plurality of apertures that connect the outer surface with the roller interior. The roller may have a non-deformable and/or non-absorbent outer surface.

9 Claims, 5 Drawing Sheets

HERBICIDE APPLICATOR

BACKGROUND OF THE INVENTION

The present invention is directed generally to herbicide applicators and more particularly to a rollable herbicide applicator.

Herbicides are typically used to kill or destroy plant material. While some herbicides are selective, meaning they are effective only on specific plant material and are ineffective on other plant material, many herbicides are not selective and their application should be controlled to avoid harming non-targeted plant material. Previous herbicide applicators have typically sprayed the herbicide through the air directly onto the plant material. The spray stream is difficult to control, however, as the wind may cause the herbicide spray to drift onto non-target plant material. Wind drift is especially problematic where precise application of the herbicide is desired, such as close to flower beds or other plantings. Thus, there exists a need for alternative approaches to herbicide application, preferably methods that allow for more precisely controlling the application of herbicide to targeted plant material.

SUMMARY OF THE INVENTION

The present invention, in some embodiments, is directed to an herbicide applicator assembly for applying herbicide to a treatment area. The applicator assembly includes a frame and a contact roller rotatably coupled to the frame for applying herbicide to the treatment area. Herbicide is supplied to the roller and transferred to the treatment area as the roller rolls across the treatment area.

In one embodiment, the present invention is directed to an herbicide applicator assembly for applying herbicide to a treatment area. The applicator assembly includes a frame, a hollow contact roller rotatably coupled to the frame for applying herbicide to the treatment area having an outer surface for rolling contact with the treatment area and an interior, and a discharge port disposed in the roller interior for supply of herbicide thereto, wherein the treatment area receives the herbicide via the roller interior. The applicator assembly may further include a wiper in contact with the roller outer surface for cleaning debris therefrom. The frame may advantageously include a telescoping handle. The roller may be non-absorbent, non-deformable, and may be removable from the frame. The roller outer surface may further include a plurality of apertures therethrough connecting the roller outer surface with the roller interior, with the treatment area receiving the herbicide via the apertures. The roller may be a first roller and the applicator assembly may further include a second roller that is interchangeable with the first roller. The first roller and the second roller may have different widths. The roller may further include an absorbent second roller that is disposed within the main roller interior. The discharge port may spray the herbicide into the roller interior, and the herbicide supplied to the discharge port may be artificially pressurized.

In another embodiment, the applicator assembly includes a frame including a handle, a rigid non-absorbent contact roller rotatably coupled to the frame for applying herbicide to the treatment area having an outer surface for rolling contact with the treatment area and a hollow interior, the outer surface having a plurality of apertures therethrough connecting the outer surface with the interior, a wiper in contact with the roller outer surface for cleaning debris therefrom, a discharge port disposed within the roller interior for supply of herbicide to the roller interior, and the roller interior receiving the herbicide from the discharge port, the treatment area receiving the herbicide from the roller interior via the apertures. The applicator handle may advantageously telescope. The roller may be a first roller and the applicator assembly may further include a second roller that is interchangeable with the first roller. The roller may further include a second roller that is disposed within the main roller's interior. The discharge port may spray the herbicide into the roller interior, and the herbicide supplied to the discharge port may be artificially pressurized. The applicator assembly may further include a reservoir that is operatively connected to the discharge port for supplying herbicide thereto. The applicator assembly may further include a control valve for regulating the flow of herbicide from the reservoir to the discharge port.

In another embodiment, the applicator assembly includes a frame and a contact roller rotatably coupled to the frame for applying herbicide to the treatment area. The roller may have a non-deformable and/or non-absorbent outer surface for rolling contact with the treatment area. The roller outer surface may further include a plurality of apertures therethrough that connect the outer surface with an interior of the roller. The frame may advantageously include a wiper in contact with the roller outer surface for cleaning debris therefrom.

DETAILED DESCRIPTION OF THE INVENTION

Figure 1:
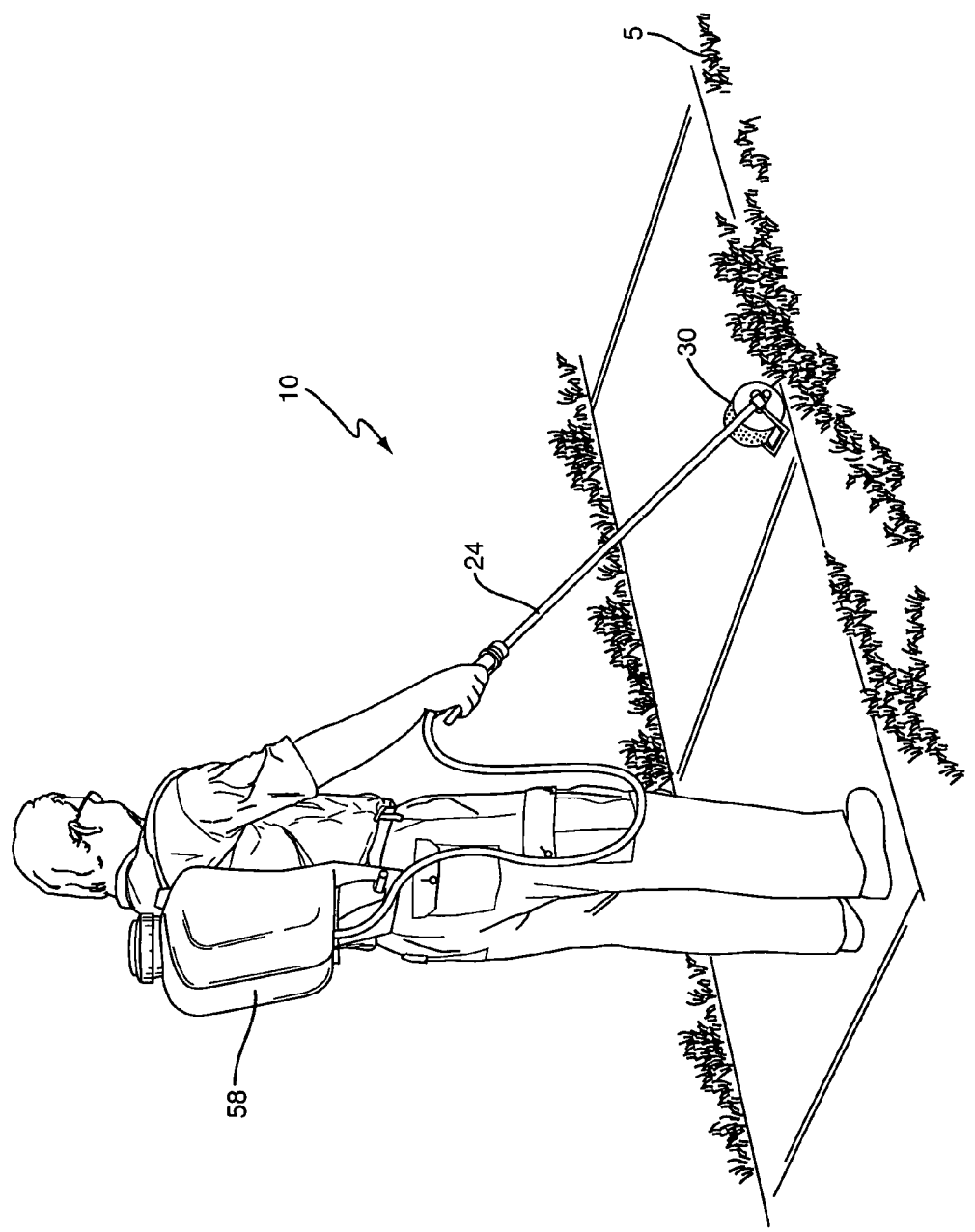
FIG. 1 shows the herbicide applicator assembly in accordance with one embodiment of the present invention in rolling contact with a treatment area.

The present invention relates to embodiments for an herbicide applicator assembly that helps control the application of herbicide to a treatment area. The herbicide applicator assembly, generally indicated at 10 in FIG. 1, includes a frame 20 and a roller 30 rotatably coupled to the frame 20 for rolling contact with the treatment area 5. Herbicide is introduced to an interior 38 of the roller 30, and the treatment area 5 receives the herbicide via the roller interior 38. Thus, the applicator assembly 10 may be used to apply herbicide to the treatment area 5 that comes into contact with the roller 30.

Figure 2:
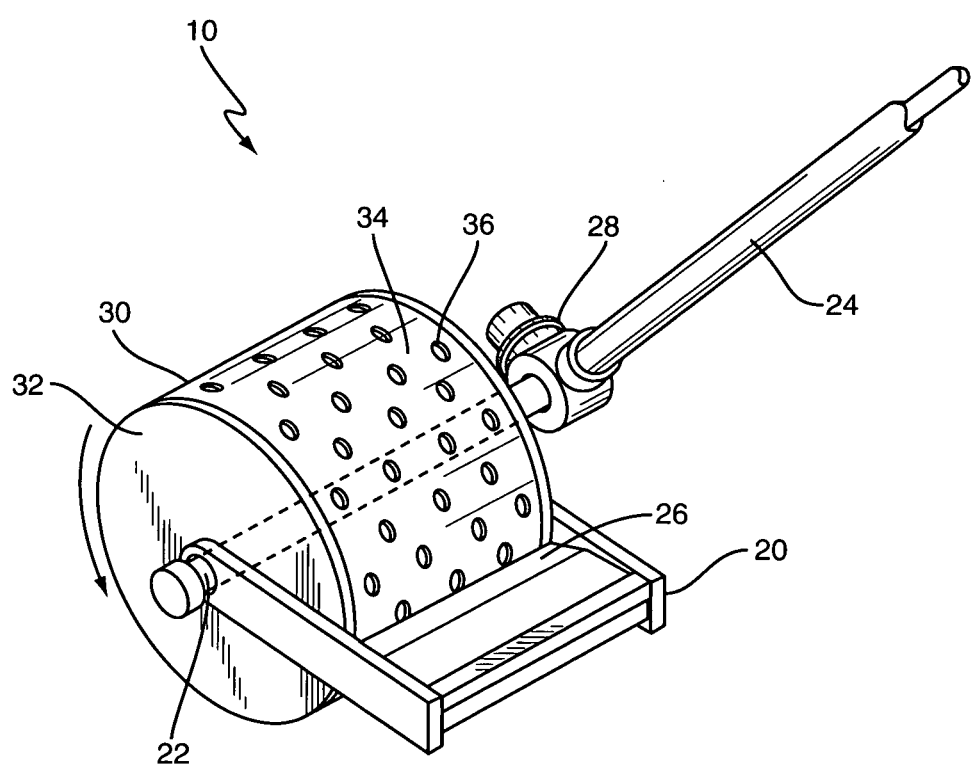
FIG. 2 shows a portion of the herbicide applicator assembly of FIG. 1.
Figure 3:
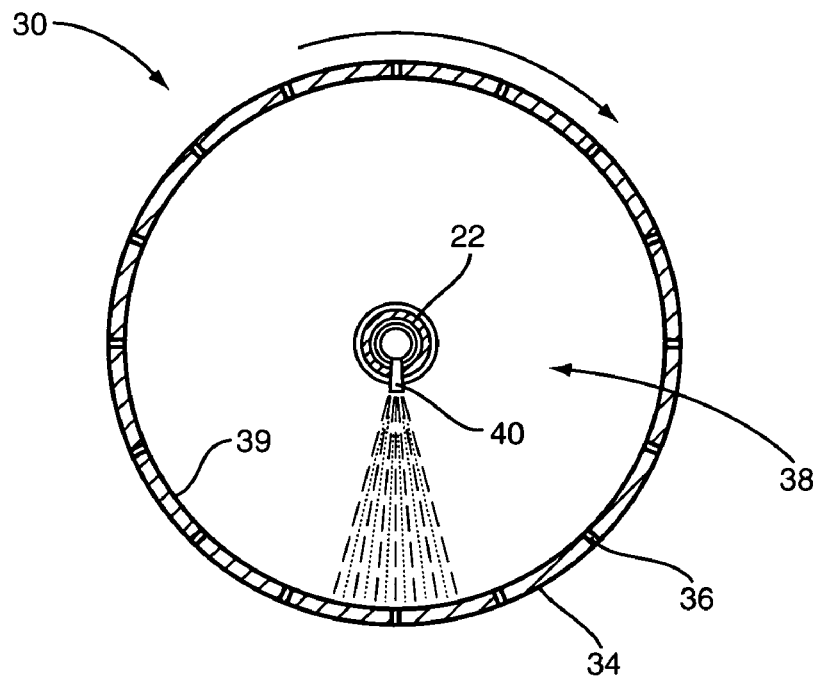
FIG. 3 shows the interior of the herbicide applicator assembly of FIG. 2.

One embodiment of the herbicide applicator assembly is shown in FIGS. 2–3. The herbicide applicator assembly 10 includes a frame 20, a roller 30, a discharge port 40, and an herbicide reservoir 50. Typically, the frame 20 includes an axle 22 supported by a number of interconnected members. The frame 20 includes a handle 24 that may be fixedly attached or removable, and may extend telescopically if desired. The handle may have internal passageways (not shown) for passing herbicide from the reservoir 50 to a connector 28. The herbicide may be transported from the connector 28 to the discharge port 40 via flexible tubing or other line systems known in the art (not shown). A check valve for controlling herbicide flow to the discharge port 40 may be associated with the connector 28 or may be disposed elsewhere on the herbicide flow path, advantageously close to the discharge port 40. In addition, the frame 20 includes a wiper 26 that contacts the roller 30 for cleaning debris therefrom. The primary purpose of the frame 20 is to provide support for the roller 30 and convenient interconnections for the other elements of the assembly 10. As such, the frame 20 may take forms other than those illustrated.

The roller 30 rotatably couples to the frame 20 about the axle 22 for rolling contact with the treatment area 5. The roller 30 typically takes the form of a hollow cylinder with end caps 32 that enclose the respective lateral ends of the roller. The axle 22 may extend through suitable holes (not shown) in the end caps 32 to rotatably couple the roller 30 to the frame 20. The outer surface 34 of the roller 30 may include a plurality of holes 36 therethrough that connect the outer surface 34 with the roller's interior 38. These holes 36 are advantageously arranged in a suitable regular array on the outer surface 34, so that the treatment area 5 contacted by the roller 30 is addressed by the holes 36 in a uniform manner. The roller 30 may be constructed of a sufficiently rigid material to support the weight of the applicator assembly 10 when rolled in contact with the treatment area 5, such as from conventional PVC tubing. Further, the roller 30 may be formed of a single material, or may be multiple concentric layers of materials if desired.

The discharge port 40 is disposed within the roller interior 38, advantageously on the roller axle 22, for expelling the herbicide into the roller interior 38. A deflector (not shown) may extend from the axle 22 at least partially over the discharge port 40 to advantageously disperse the expelled herbicide as a finely divided spray. In addition, the discharge port 40 may also stream, mist or drip the herbicide into the roller interior 38. In one embodiment, the discharge port 40 may be static and spray the herbicide generally downward into the roller interior 38. In another embodiment, the discharge port may rotate and broadcast herbicide into the roller interior 38. Advantageously, the discharge port 40 disperses the herbicide uniformly across the width of the interior surface of the roller 30. The discharge direction may be vertically down, or may be rotated slightly clockwise or counter-clockwise to achieve the desired distribution. It should be noted that the discharge port 40 may comprise one or more orifices, which are collectively referred to herein as the discharge port 40.

The reservoir 50 stores the quantity of herbicide to be supplied to the discharge port 40. The reservoir 50 couples to the frame 20 via the connector 28 to transfer the herbicide from the reservoir 50 to the discharge port 40. The reservoir 50 may be a vented gravity feed tank 54; however other forms may be used as described below. In addition, the reservoir 50 may include a control valve 52 for controlling the supply of herbicide to the discharge port 40. When the control valve 52 is open, the natural head pressure in the reservoir tank pushes the herbicide out of the reservoir 50 through the connector 28 and to the discharge port 40 where it is sprayed into the roller interior 38.

The applicator assembly 10 provides herbicide to the treatment area 5 that is in rolling contact with the roller outer surface 34. Herbicide is dispersed into the roller interior 38 and then received by the treatment area 5 from the roller interior 38. First, the reservoir 50 is loaded with the herbicide, preferably with the control valve 52 closed to prevent uncontrolled herbicide flow from the reservoir 50. With the control valve 52 closed, the reservoir 50 may be loaded remote from the treatment area 5 and the applicator assembly 10 may be rolled thereto without applying herbicide. When the applicator assembly 10 is positioned at the desired treatment area 5, the control valve 52 may be opened to permit the flow of herbicide from the reservoir 50, through the connector 28, and into the discharge port 40. The discharge port 40 expels the herbicide into the roller interior 38. The treatment area 5 in contact with the roller outer surface 34 receives the herbicide from the roller interior 38 as the roller 30 rolls across the treatment area 5 via the holes 36 arrayed on the roller outer surface 34. The treatment area 5 may receive the herbicide directly via the holes 36. However, some of the herbicide from the discharge port 40 may contact the non-perforated portions of the roller interior 38 wall; this herbicide is contained within the roller interior 38 and flows to the holes 36 for subsequent delivery to the treatment area 5. When the treatment area 5 has been covered, the control valve 52 may be closed to stop the flow of herbicide to the discharge port 40, and the applicator assembly 10 may be transported to the next treatment area 5.

Figure 5:
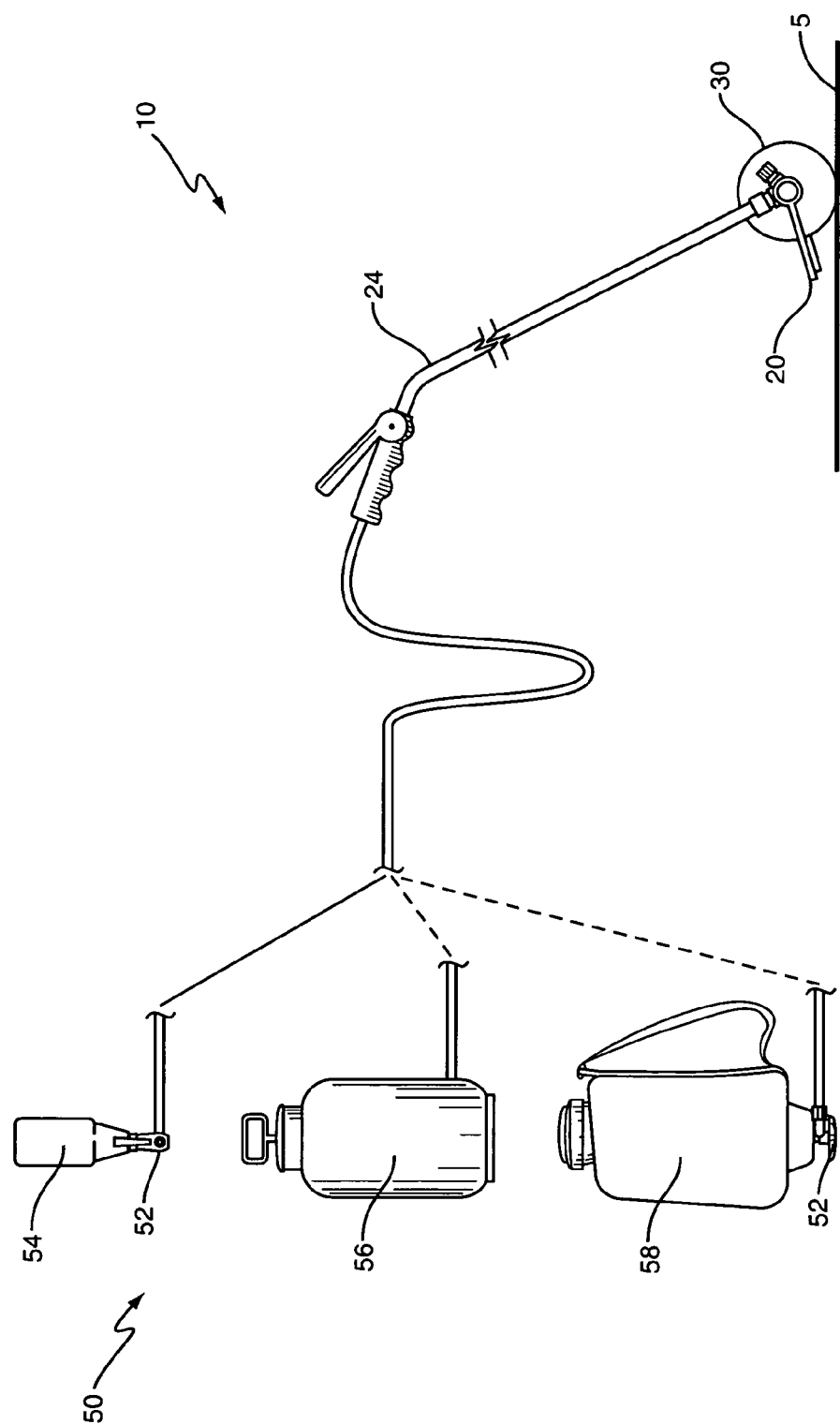
FIG. 5 shows the herbicide applicator assembly of FIG. 2 with various herbicide reservoirs.

In the discussion above, the reservoir 50 was unpressurized, however that is not required in all embodiments. In some embodiments, the reservoir 50 may be pressurized by pumping air or other gases into the reservoir 50 to create an artificial pressure that propels the herbicide from the reservoir 50. The reservoir 50 may be pressurized by a manual diaphragm pump; however, any manual or motorized pump known in the art may be used. As illustrated in FIG. 5, such pressurizable reservoirs 50 may take the form of a conventional hand-pump herbicide container 56 or a wearable backpack 58.

Figure 4:
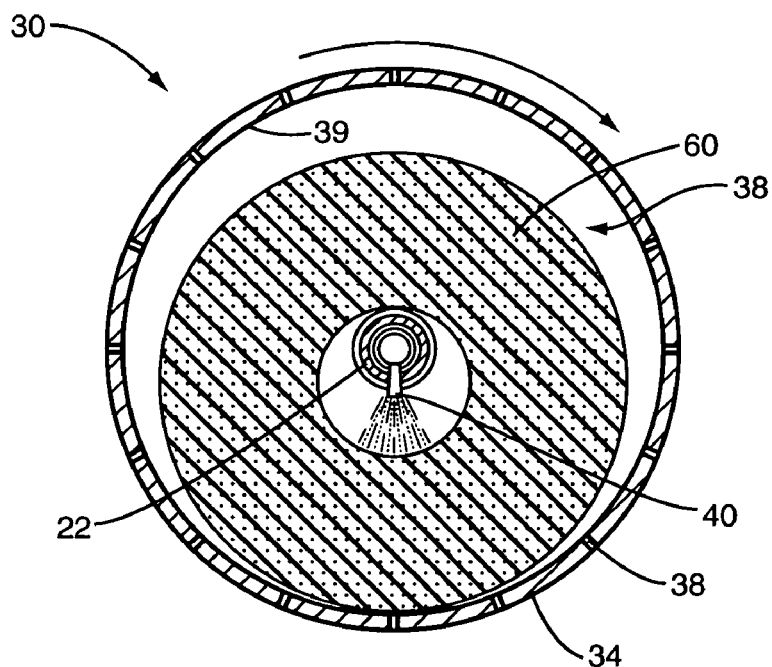
FIG. 4 shows the interior of another embodiment of the herbicide applicator assembly having an interior second roller.

The roller 30 in the discussion above has been described as having a hollow interior 38 without any intervening structure between the discharge port 40 and the inner wall 39 of the roller 30. However, in other embodiments, such as that illustrated in FIG. 4, the roller interior 38 may further include an interior roller 60 that is loosely coupled around the axle 22. The interior roller 60 may rotate independently of the main roller 30. In this embodiment, the interior roller 60 surrounds the discharge port 40 and is advantageously absorbent for receiving the herbicide expelled from the discharge port 40. Upon contacting the main roller inner wall 39, the interior roller 60 desorbs the herbicide onto the treatment area 5 via the holes 36 in the main roller outer surface 34. Some of the desorbed herbicide may contact the non-perforated portions of the main roller inner wall 39. The interior roller 60 may reabsorb this herbicide for subsequent delivery to the treatment area 5. Herbicide that is not reabsorbed is contained within the main roller interior 38 and flows to the holes 36 for subsequent delivery to the treatment area 5.

The roller 30 has been described above as being substantially rigid and non-absorbent, however this is not required in all embodiments. The roller 30 may be constructed of various semi-pliable materials. Additionally the roller 30 may, if desired, be absorbent to receive the herbicide expelled from the discharge port 40. In this embodiment, the roller outer surface 34 is not required to have holes 36 per se, as the roller 30 may simply desorb the herbicide onto the treatment area 5. These alternative roller arrangements are believed to be less desirable, as they increase the likelihood that debris material will be retained on the roller's outer surface 34 and thereby impede the uniform application of herbicide. In addition, it is believed that rollers with soft exteriors will tend to be harder to roll across the treatment area 5.

Figure 6A:
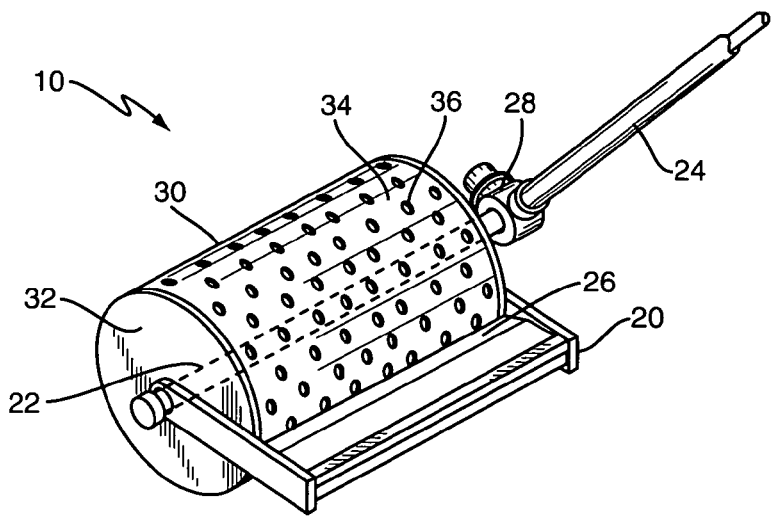
FIGS. 6A–6C show the herbicide applicator assembly of FIG. 2 with a various width rollers.
Figure 6B:
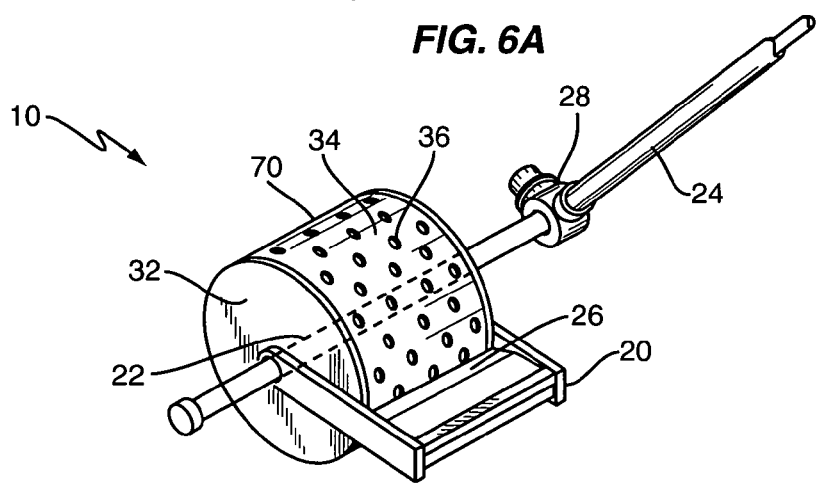
Figure 6C:
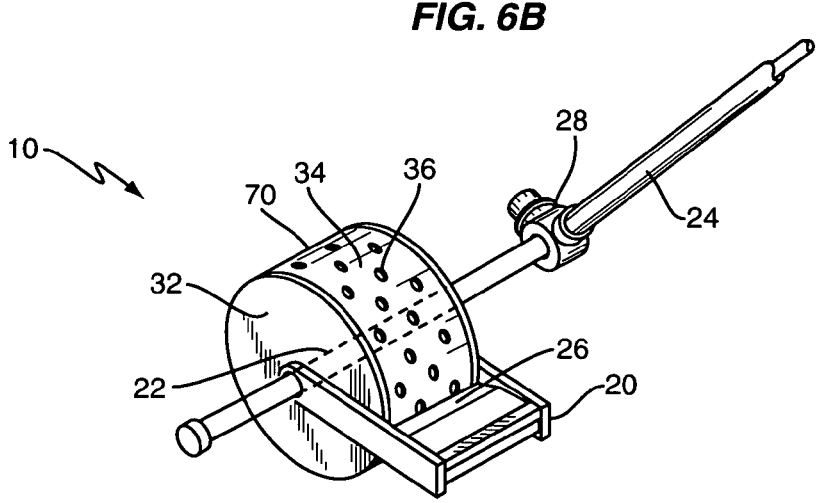

It should be noted that the roller 30 may be permanently attached to the frame 20; however, this is not required in all embodiments. For example, the roller 30 may be removably secured in the frame 20 via spring clips or any releasable fastener system known in the art. Removing the roller 30 is advantageous so that a second roller 70 may replace the first roller 30. The first roller 30 may simply wear out or become damaged requiring replacement; however, the user may also choose to replace the first roller 30 for other reasons. For instance, different types of herbicide may have dedicated rollers to avoid herbicidal mixing. Further, the second roller 70 may have different hole configurations from the first roller 30 because of different herbicide viscosity and/or plant material density in the treatment area 5. In addition, the width, depth and/or density of the treatment area 5 may require rollers of various widths and/or diameters. To accommodate for these variations, the second roller 70 may have a width and/or diameter different from the first roller 30, as illustrated in FIG. 6.

The types and formulations of herbicides suitable for use in the present may be selective or non-selective, and may be formulated as pre-mixed liquids, liquid concentrates, gels, or wettable powders.

At least one embodiment of the herbicide applicator assembly 10 has been tested to confirm that it works for its intended purposes. According to tests run by Dr. Gary T. Roberson of North Carolina State University, the tested herbicide applicator assembly 10 performed well in limiting the application of herbicide to the desired treatment area 5.

The present invention may, of course, be carried out in other specific ways than those herein set forth without departing from the essential characteristics of the invention. The present embodiments are, therefore, to be considered in all respects as illustrative and not restrictive, and all changes coming within the meaning and equivalency range of the appended claims are intended to be embraced therein.

We claim:

1. An herbicide applicator assembly for applying herbicide to a treatment area, comprising:
   a frame;
   a hollow and undriven contact roller rotatably coupled to the frame for applying herbicide to the treatment area; the roller having a non-absorbent rolling contact outer surface for rolling contact with the treatment area and an interior; said surface having a plurality of apertures therethrough extending to the roller interior;
   a reservoir distinct from said roller and having un-pressurized herbicide therein;
   a discharge port disposed in the roller interior for supply of herbicide thereto; said discharge port receiving said herbicide in an un-pressurized fashion and supplying the same to the roller interior;
   wherein the treatment area receives the herbicide via the roller interior and said apertures via direct contact with said rolling contact outer surface of said contact roller.

2. The applicator assembly of claim 1 further including a wiper in contact with the roller outer surface for cleaning debris therefrom.

3. The applicator assembly of claim 1 wherein the frame includes a telescoping handle.

4. The applicator assembly of claim 1 wherein the roller is non-deformable.

5. The applicator assembly of claim 1 wherein the roller is removable from the frame.

6. The applicator assembly of claim 1 wherein the roller is a first roller and further including a second hollow roller interchangeable with the first roller.

7. The applicator assembly of claim 6 wherein the first roller and second roller have different widths.

8. The applicator assembly of claim 1 further including a control valve for regulating the flow of herbicide from the reservoir to the discharge port.

9. The applicator assembly of claim 1:
   further including a wiper in contact with the roller outer surface for cleaning debris therefrom;
   wherein the roller is removable from the frame;
   wherein the roller is a first roller and further including a second hollow roller interchangeable with the first roller;
   further including a control valve for regulating the flow of herbicide from the reservoir to the discharge port.

* * * * *